(12) United States Patent
Raja et al.

(10) Patent No.: US 10,789,406 B1
(45) Date of Patent: Sep. 29, 2020

(54) CHARACTERIZING ELECTRONIC COMPONENT PARAMETERS INCLUDING ON-CHIP VARIATIONS AND MOMENTS

(71) Applicant: Cadence Design Systems, Inc., San Jose, CA (US)

(72) Inventors: Shiva Raja, Chelmsford, MA (US); Igor Keller, Pleasanton, CA (US); Ling Wang, BeiJing (CN)

(73) Assignee: Cadence Design Systems, Inc., San Jose, CA (US)

( * ) Notice: Subject to any disclaimer, the term of this patent is extended or adjusted under 35 U.S.C. 154(b) by 18 days.

(21) Appl. No.: 16/193,803

(22) Filed: Nov. 16, 2018

(51) Int. Cl.
| | |
|---|---|
| *G06F 30/3323* | (2020.01) |
| *G06F 30/30* | (2020.01) |
| *G06F 30/367* | (2020.01) |
| *G06F 30/3312* | (2020.01) |
| *G06F 111/04* | (2020.01) |
| *G06F 111/10* | (2020.01) |
| *G06F 111/20* | (2020.01) |
| *G06F 119/12* | (2020.01) |

(52) U.S. Cl.
CPC .......... *G06F 30/3323* (2020.01); *G06F 30/30* (2020.01); *G06F 30/3312* (2020.01); *G06F 30/367* (2020.01); *G06F 2111/04* (2020.01); *G06F 2111/10* (2020.01); *G06F 2111/20* (2020.01); *G06F 2119/12* (2020.01)

(58) Field of Classification Search
USPC ........................................................ 716/108
See application file for complete search history.

(56) References Cited

U.S. PATENT DOCUMENTS

| | | |
|---|---|---|
| 7,761,826 B1 | 7/2010 | Thanvantri et al. |
| 8,595,669 B1 | 11/2013 | Keller et al. |
| 8,615,725 B1 | 12/2013 | Keller et al. |
| 8,782,583 B1 | 7/2014 | Tiwary et al. |
| 8,924,905 B1 | 12/2014 | Keller et al. |
| 8,938,703 B1 | 1/2015 | Saurabh et al. |
| 8,966,421 B1 | 2/2015 | Kariat et al. |
| 9,003,342 B1 | 4/2015 | Keller et al. |
| 9,129,078 B1 | 11/2015 | Keller et al. |
| 9,384,310 B1 | 7/2016 | Keller et al. |
| 9,582,626 B1 | 2/2017 | Keller et al. |
| 9,594,858 B1 | 3/2017 | Tseng et al. |
| 9,710,593 B1 | 7/2017 | Keller et al. |
| 9,881,123 B1 | 1/2018 | Goyal et al. |
| 9,928,324 B1 | 3/2018 | Keller et al. |
| 2004/0034840 A1* | 2/2004 | Chen .................... G06F 30/367 716/115 |
| 2007/0277134 A1* | 11/2007 | Zhang ................. G06F 30/3312 716/113 |

(Continued)

*Primary Examiner* — Mohammed Alam
(74) *Attorney, Agent, or Firm* — Foley & Lardner LLP (57) ABSTRACT

The present embodiments are generally directed to electronic circuit design and verification and more particularly to techniques for characterizing electronic components within an electronic circuit design for use in verification. In one or more embodiments, an adaptive sensitivity based analysis is used to build an adaptive equation to represent the timing response surface for an electronic component. With the adaptive surface response built, a sample-based evaluation yields highly accurate extraction of electronic component timing parameters including on-chip variation information such as sigma and moments.

18 Claims, 5 Drawing Sheets

(56) References Cited

U.S. PATENT DOCUMENTS

| | | | |
|---|---|---|---|
| 2010/0229137 A1* | 9/2010 | Liu .................... | G06F 30/3312 |
| | | | 716/113 |
| 2011/0040548 A1* | 2/2011 | Khalily ................ | G06F 30/367 |
| | | | 703/14 |
| 2015/0339414 A1* | 11/2015 | Kuo ....................... | G06F 17/18 |
| | | | 716/103 |

* cited by examiner

CHARACTERIZING ELECTRONIC COMPONENT PARAMETERS INCLUDING ON-CHIP VARIATIONS AND MOMENTS

TECHNICAL FIELD

The present embodiments relate generally to electronic circuits, and more particularly to techniques for characterizing parameters of electronic components for use in designing and verifying electronic circuits.

BACKGROUND

Integrated circuit (IC) designs (e.g., designs for application specific integrated circuits (ASICs) or systems on a chip (SOCs)) are increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. As is well known in the art, the designed IC can eventually be fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using static timing analysis (STA) or gate level simulation (GLS).

Timing analyses utilize timing models that provide, for example, timing information (e.g., timing attributes, timing constraints, etc.) and/or other description (e.g., cell description, bus description, environment description, etc.) for electronic design components in the design. Standard library timing models often employed in this regard include, for example, Liberty format specified .lib library models for defining the delays of standard digital gates (AND, OR, NOT, FLOP, LATCH etc.).

Library models for analyzing timing of standard electronic components (e.g. standard cells) can be obtained from a foundry or IP provider. These timing models can be acceptable in a number of scenarios, including designs at larger process nodes, such as 90 nm or larger, designs that do not require high speeds or performance, and/or designs operating either at or higher than three times the transistor threshold voltage. This is at least partially because at larger nodes, timing margins simply aren't a significant portion of overall timing constraints. But relying on these library models becomes problematic for high-speed or high-performance designs and, particularly, designs at advanced nodes.

SUMMARY

The present embodiments are generally directed to electronic circuit design and verification and more particularly to techniques for characterizing electronic components within an electronic circuit design for use in verification. In one or more embodiments, an adaptive sensitivity based analysis is used to build an adaptive equation to represent the timing response surface for an electronic component. With the adaptive surface response built, a sample-based evaluation yields highly accurate extraction of electronic component timing parameters including on-chip variation information such as sigma and moments.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments relate generally to the design and verification of ICs, including the characterization of electronic components within the IC for use in verification. In one or more embodiments, an adaptive sensitivity based analysis is used to build an adaptive equation to represent the timing response surface for an electronic component. With the adaptive surface response built, a sample-based evaluation yields highly accurate extraction of electronic component timing parameters including on-chip variation information such as sigma and moments.

Among other things, the present applicant recognizes that in lower power applications, IC designs need to be verified to operate at low voltages. However, at low voltages there can be very high variability of timing due to process affects. More particularly, at 16 nm processes and below, on-chip variation (OCV) becomes an important issue. Increasing process variation makes a larger impact on timing, which becomes more pronounced in low-power designs with ultra-low voltage operating conditions. Accordingly, more accurate library characterization and variation modeling is needed to reduce timing margins in library files to account for these process variation effects. Such an improved library characterization methodology can result in reduced timing pessimism, which can further accelerate timing signoff.

Most design and verification engineers get their library files for standard cells or other electronic components from the foundry or IP provider. However, as set forth above, relying on these library files becomes problematic for high-speed or high-performance design and, particularly for designs at advanced nodes. When foundries and IP providers create libraries for standard cells, I/Os, memories, and/or mixed-signal blocks, most of them perform simulations to model timing delays and constraints and add margins to cover timing variation. However, pre-packaged models from an IP provider or memory compiler may lack the accuracy needed, particularly since the exact context of the macro won't be known until it is placed on the chip.

Process variation, which increases at advanced nodes, conventionally results in additional timing margins added to the libraries as set forth above. This creates a tradeoff at smaller processes—either the IC design has to run slower to achieve a higher yield, or yield is sacrificed to achieve a higher speed design. IoT, wearables, and mobile applications are developed on advanced nodes to take advantage of the low-power and high-performance benefits of these processes. In order to ensure that a particular IC design can take full advantage of the power, performance, and area (PPA) benefits of advanced processes, it is desirable to keep timing margins in check and to accelerate timing signoff by reducing timing margins.

For these and other reasons, advanced-node design calls for many more library views to achieve high-quality silicon and also to avoid silicon re-spins resulting from inaccurate signoff analysis. It is not uncommon at these processes to have low-, nominal-, and high-threshold cells, each with different power and performance characteristics, to manage leakage power. Among other things, the present applicant recognizes that it is desirable to characterize each library process corner over many voltages and temperatures, in order to accurately model instance-specific voltage variation or temperature gradients. For many advanced processes, alternative cell libraries are commonly offered to improve yield, trading off area and performance. There are also now more contributors to timing variation to consider. For example, at advanced nodes, as gate length decreases, the single transistor threshold voltage (Vth) variation increases. At the same time, to preserve the low power and long battery life desired by applications such as IoT and wearables, the value of supply voltage (Vdd) goes down. As a result of these two scenarios, timing variation increases and becomes more pronounced. So, it's no longer enough to run timing analysis on a slow process corner and a fast corner of a batch of wafers to determine whether a chip has met its timing constraints. Now there are significant variations across individual wafers and even at the intra-die level (i.e. OCV).

There has been an evolution of approaches in static timing analysis (STA) to address OCV. Monte Carlo simulation is currently the most accurate in addressing timing variation, accounting for each timing arc, rising and falling edges or transitions, conditions for side inputs, and dependency on input slews and output loads. However, considering the number of cells in a library, the number of corners that need to be simulated, and the number of slew/load multipliers in each cell, it may be necessary to perform billions of such simulations for each library, which is time-consuming and expensive.

Recently, the Liberty Technical Advisory Board (LTAB) has converged on a unified Liberty Variance Format (LVF) that includes OCV modeling along with existing timing, noise, and power models. LVF represents variation data as a slew-/load-dependent table of sigmas per timing arc (pin, related pin, when condition). Tables are supported for delay, transition, and constraint variation modeling. Major foundries are now working to support LVF at advanced nodes, and timing signoff tools (e.g., STA tools) have been updated.

A popular method called Root Sum Squared (RSS), is employed today to characterize LVF parameters for library cells. With low voltage and/or high voltage threshold cells, however, this method cannot accurately characterize variability effects on timing, which can be non-linear. As set forth above, large inaccuracies in variation timing models introduces uncertainty in predicting yield. Moreover, recently model parameters such as moments have been proposed to handle high non-Gaussian distributions. However, conventional characterization methods cannot generate accurate timing models with moments.

Figure 1:
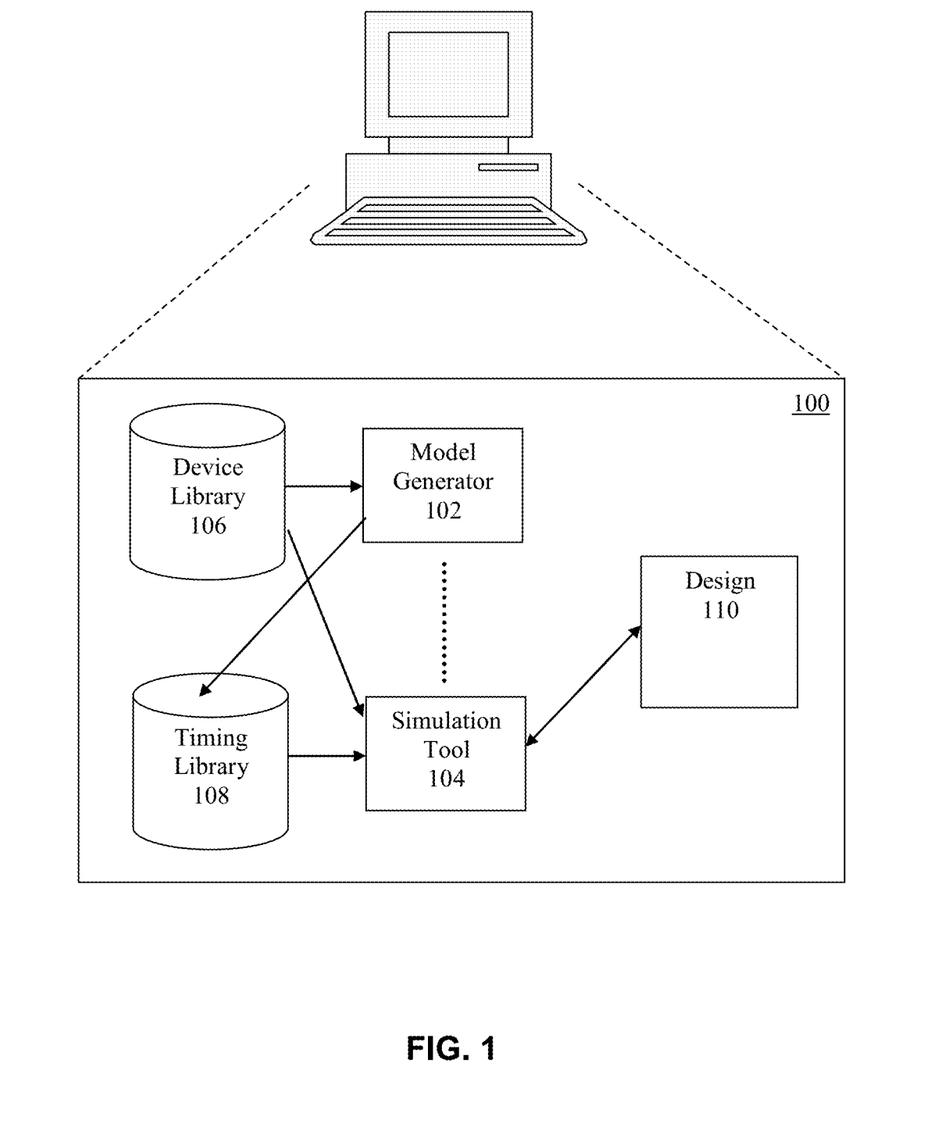
FIG. 1 is a block diagram on example system for verifying an IC design according to embodiments.

According to certain aspects, therefore, the present embodiments provide a methodology for overcoming these and other shortcomings with conventional characterization approaches. To assist in illustrating various aspects of the present embodiments, FIG. 1 is a block diagram of an example design and verification environment 100.

As shown in the example environment 100, one or more EDA tools 102 and 104 are used in the process of creating and/or verifying a design 110 (e.g. a netlist), such as electronic circuit design tools, circuit simulation tools, layout design tools, layout verification tools, mixed signal design tools, etc. More particularly, as shown in this example, environment 100 includes a model generation tool 102 and a simulation tool 104. The simulation tool 104 may be any type of static timing analyzer (STA) such as a statistical static timing analyzer (SSTA), and further details thereof will be omitted here for sake of clarity of the invention.

According to certain aspects to be described in more detail below, model generator 102 is configured for characterizing and generating device timing models 108 for standard cell circuits (logic cells), the details of which are stored in the device library 106, including generating timing variation parameters such as LVF parameters and moments, as will be described in more detail below. For example, it can generate timing models 108 that can be used with multiple SSTAs without requiring re-characterization for each unique format. Model generator 102 can also generate for output to libraries 108 advanced on-chip variation (AOCV) tables, statistical on-chip variation (SOCV) tables, and LVF tables.

In embodiments, model generator 102 calculates nonlinear sensitivity, accounting for systematic and random variation for any set of correlated or uncorrelated process parameters. The resulting models in library 108 can be used to model both local (within-cell and within-die) variations and global die-to-die variations for use by SSTA 104. SSTA provides a more realistic estimation of timing relative to actual silicon performance, often reducing worst-case timing margins by 10-15%, resulting in a higher performing, higher yielding silicon. The present applicant recognizes that to accurately predict variation, SSTA needs variation-aware timing models in library 108 that account for both systematic process variations (e.g., due to lithography) and random process variations (e.g., due to doping fluctuations between transistors).

As will be described in more detail below, model generator 102 creates models for SSTA consumption by characterizing each cell for a given set of process parameter variations where the amount of variation is based on statistical SPICE models or actual process measurements. The non-linear sensitivity to process variation for all relevant timing constructs is captured in models 108, and can include delay tables, slew tables, pin capacitance, and timing constraints. Advanced current source models (CCS and ECSM) can also be supported. Model generator 102 can generate multiple SSTA formats from a single cell in device library 106. Cadence S-ECSM format, multiple Synopsys Liberty files, and Synopsys compact CCS VA format can also be supported. Custom SSTA formats can be further supported using a Tcl API to the device library 106. Process parameter variation parameter variations can be characterized as uncorrelated, correlated, or partially correlated. Uncorrelated parameter sets are simulated independently while correlated parameter sets are simulated together. Partial correlation can be supported through the use of a correlation matrix provided by the foundry. Any process parameter present in the input SPICE model can be characterized including physical parameters such as XL or Vth, or intermediate parameters that have been derived from principle component analysis (PCA).

For systematic inter-cell variation, the process varies in the same direction by the same amount for each transistor inside a cell. Systematic variation can be used to model both on-chip (local) and off-chip (global) variation. Random intra-cell variation models the process variations that apply to each transistor independently (also known as mismatch). To characterize random variation efficiently, model generator 102 avoids characterizing every transistor uniquely for every table entry. This method has been validated to be highly accurate against traditional Monte Carlo simulations.

It should be noted that environment 100 can be implemented in various ways. For example, environment 100 can be implemented by one or more general purpose computers that are loaded with an operating system executing software and/or customized to include hardware for designing and verifying electronic circuits, as adapted with functionality of the present embodiments to be described in more detail below. In some embodiments, the one or more computing systems comprise and/or communicate with various components not shown such as the processor(s) or processor core(s), memory, disks, etc. The one or more computing systems may further write to and read from a local or remote volatile or non-volatile computer accessible storage not shown that stores thereon data or information such as, but not limited to, libraries 106, 108 and design 110, and can include one or more databases such as physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software for implementing some or all of the functionality of one of EDA tools 102, 104 and one or more client computers (e.g., multi-core CPUs) can communicate with the server computer(s) via a network to perform some or all of the functionality of other EDA tools 102, 104 for a particular design, either independently or operating in parallel. Such computing systems can further include one or more computing systems loaded with user interface functionality (e.g., displays, keyboards, mice, touchscreens, menus, drop-down lists, windows, controls, text boxes, etc.) for providing designers with controls for designing or verifying a particular design, including providing any user-required inputs and viewing any results in connection with the present embodiments.

As should be apparent to those skilled in the art, the design 110 (including a design that has been created using one or more timing models generated by the present embodiments) can include or be implemented by one or more computer-readable files (e.g., GDS II, OASIS, etc.) that describe the circuit layout containing the physical locations and dimensions of the circuit's components, interconnections, and various layers from the design, in accordance with a target fabrication process. These one or more files can be provided to a fab so the design can be fabricated, creating the IC. As is well known in the art, the designed IC can eventually be fabricated by lithographically transferring or printing the circuit layout to a semiconductor substrate in a series of layers that collectively will form the features that constitute the devices that make up the components of the integrated circuit.

Figure 2:
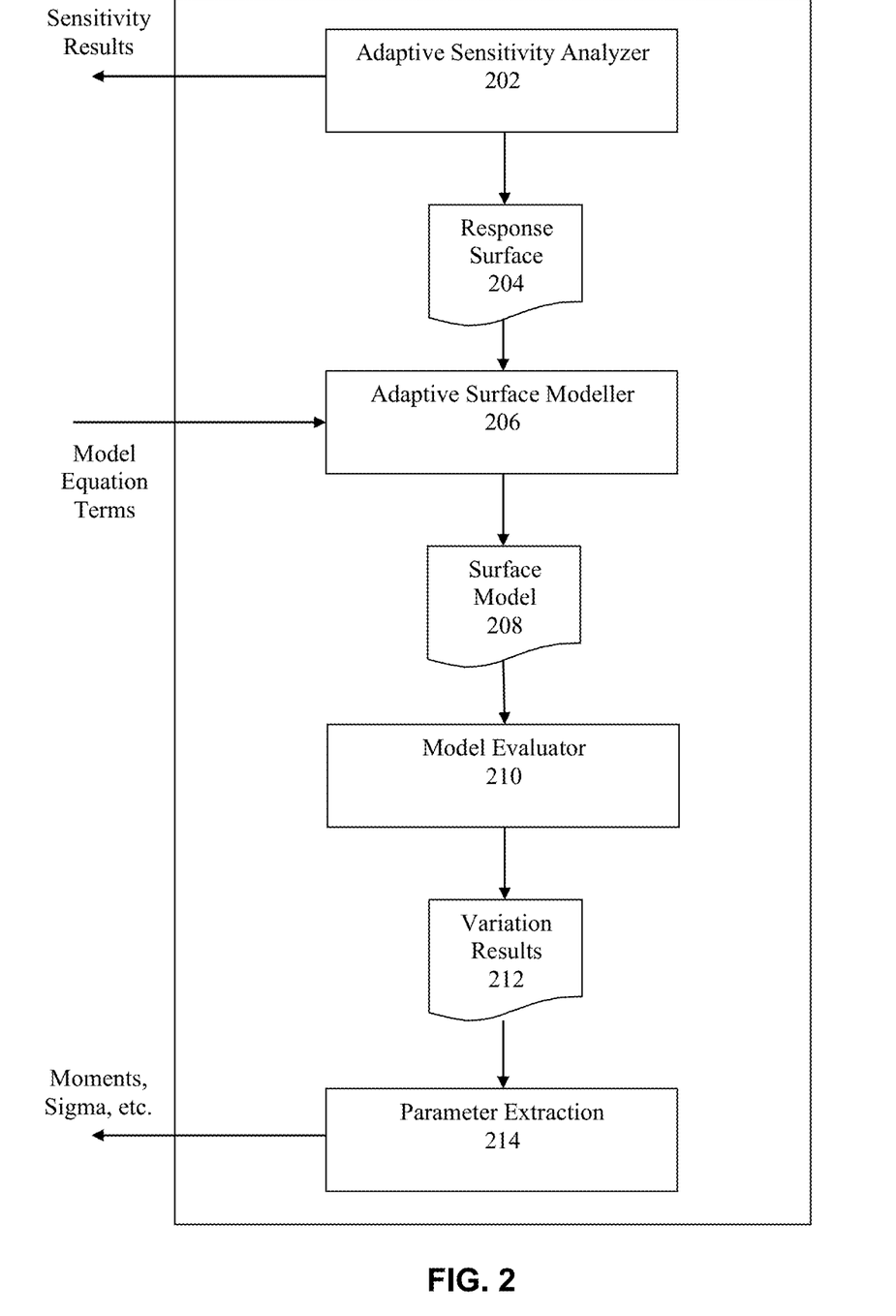
FIG. 2 is a functional block diagram of an example embodiment of a module for characterizing timing parameters of an electronic component.

FIG. 2 is a functional block diagram illustrating an example model generator module 102 according to embodiments.

In general, as shown in FIG. 2, model generator 102 uses an adaptive sensitivity analyzer 202 to produce a process parameter response surface 204 and an adaptive surface modeler 204 to build an adaptive equation 208 to represent or model the process parameter response surface 206. With surface model 208 built, a model evaluator 210 performs a sample based evaluation that yields variation data 212, from which a parameter characterization module 214 can extract non-linear and OCV timing model parameters such as Sigma and Moments. According to certain aspects, whereas current methods either fix the equation form, or the sensitivity simulations, or use directed sampling methods, the present embodiments adaptively change the sensitivity extraction and equation structure based on the nature of the circuit response, without having to explore the entire sampling space. This allows modeling high and low probability areas of the response.

In more detail, adaptive sensitivity analyzer 202 performs sensitivity analysis by analyzing variations on entire circuit components (e.g., transistors) and/or automatically identified timing paths therein. In embodiments, for a given arc and/or a particular cell, adaptive sensitivity analyzer 202 considers the impact on a timing output of interest (e.g. delay or constraint) of input slew and output load, as well as the impact of all process variation parameters that need to be evaluated. A timing delay or timing constraint variation surface 204 for the impact that the process parameter has on timing is created.

As shown in the example of FIG. 2, sensitivity results from adaptive sensitivity analyzer 202 can be reviewed (e.g., via a user interface that includes a results display that is refreshed or updated by adaptive sensitivity analyzer 202) to adaptively change the type of number of sensitivity measurements to be performed. For example, if the sensitivity response to a particular process parameter appears highly non-linear, further analysis may be performed by adaptive sensitivity analyzer 202 using different parameter variation values or points and/or in combination with additional parameter variations of other process parameters (e.g., by a designer via a user interface with corresponding controls).

Adaptive sensitivity analyzer 202 can include or be implemented by commercially available circuit simulators such as Eldo, FineSim or HSpice, and can perform simulations at any level of granularity from a single arc to a complete cell.

Adaptive surface modeler 206 generates a model equation 208 that models the response surface 204 created by adaptive sensitivity analyzer 202. In embodiments, the generated model equation f(P) represents the delay or slew or timing constraint value (i.e. output of adaptive sensitivity analyzer 202) for a given set of parameters P={$p_1$, $p_2$}, where $p_1$ and $p_2$ are specific process parameters for a specific transistor or cell. For example, the process parameter $p_1$ or $p_2$ can be of the type XM01@parl1, where XM01 is transistor instance of a cell, and parl1 is a Spice model process parameter for the cell from device library 106 (e.g., supplied by a foundry). The equation f(P) typically has a nominal value f(0) and as any number of model equation terms as are needed to model the response surface 204. The nominal value f(0) is the value of the delay or slew or timing constraint determined by analyzer 202 when the parameters P are at their nominal value, as specified by the Spice model from the foundry. The model terms can include single parameter terms f(p) that specify contributions to the delay or slew or timing constraint as a function of a single process parameter (i.e., p is either $p_1$ or $p_2$), and/or cross terms f($p_1$, $p_2$) based on a combination of contributions from both parameters. Any number of curve-fitting or surface-fitting techniques may be used to implement adaptive surface modeler 206.

Model evaluator 210 takes the surface model 208 from adaptive surface modeler 206 and evaluates the equation f(P) at a large number of sample points of $p_1$ and $p_2$. For example, model evaluator 210 can include or be implemented by a Monte Carlo simulator to generates random sets of values of $p_1$ and $p_2$ to be used as inputs to the equation f(P), from which corresponding sample output values of the equation f(P) are produced, yielding a large number of process parameter variation results 212.

In embodiments, parameter extraction module 214 builds a histogram of the results 212 and then analyzes the histogram to extract LVF parameter values such as mean, sigma, moments, etc. Any number of well-known statistical methods can be used to implement parameter extraction module 214, and so further details thereof will be omitted here for sake of clarity of the invention.

Figure 3:
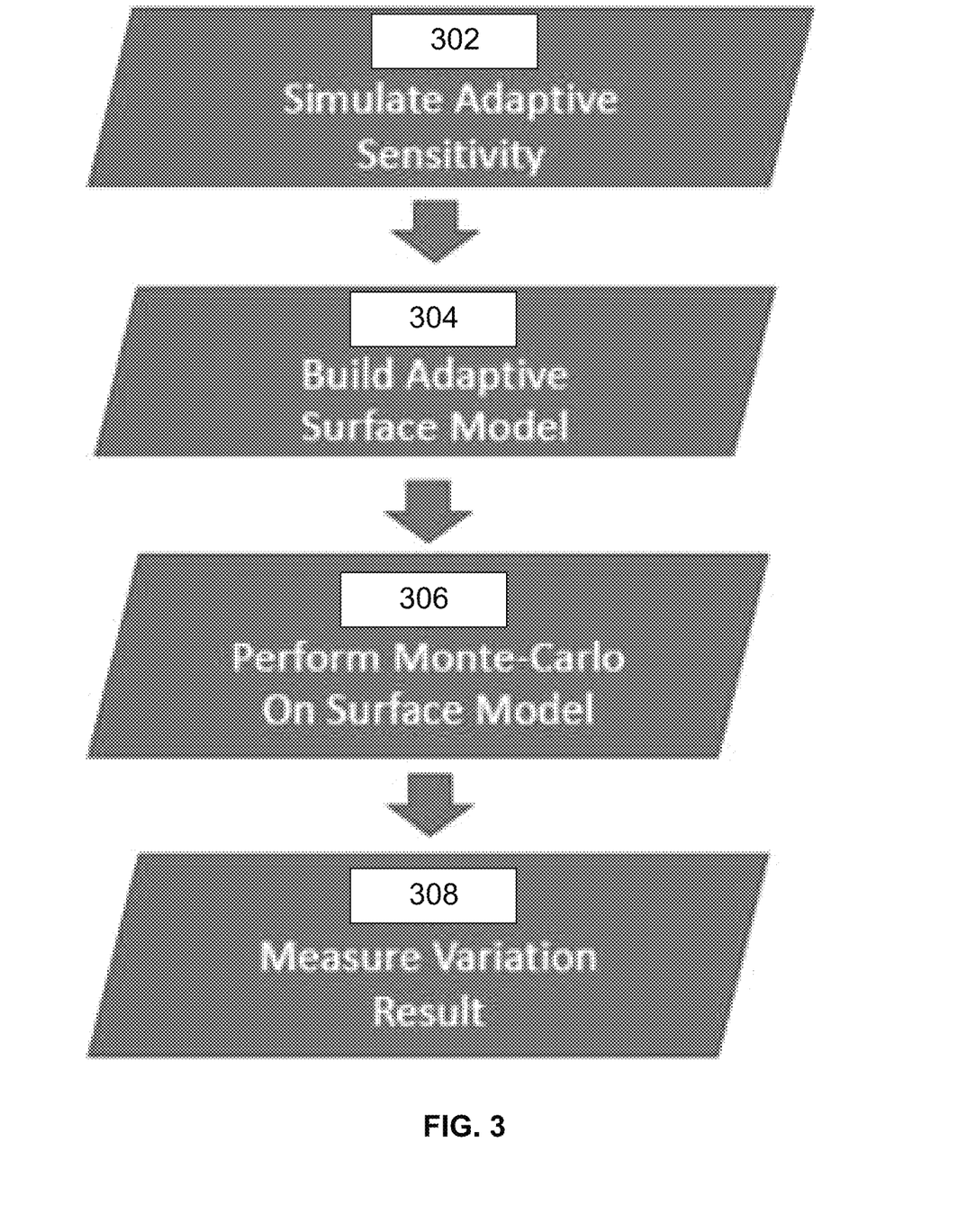
FIG. 3 is a flowchart illustrating an example methodology for characterizing timing parameters of an electronic component according to embodiments.

FIG. 3 is a flowchart illustrating an example methodology that can be implemented by model generator 102 such as that described in connection with FIG. 2 according to embodiments. This example methodology will be described in connection with an example of characterizing delays for one or two process parameters for a single LVF format slew/load table entry for a single electronic component or timing arc. However, it should be appreciated that such a table may include entries for many different values of slew and load, for example on the order of ten entries for both slew and load, and so this methodology may be repeated for each of those different table entries. Moreover, it should be appreciated that this methodology may be repeated for many different process parameters, and many different combinations of process parameters other than pairs as described in this example. Still further, it should be appreciated that this methodology is not limited to characterizing delays, but may also be used to characterize other timing factors such as constraints.

As shown in the example methodology of FIG. 3, a first block 302 includes adaptively deciding the space to explore for calculating the process parameter sensitivity. According to certain aspects, embodiments aim to measure sensitivity for the electronic component as a set of DOE (Design of Experiments), by varying one or two process parameters at a time. In these and other embodiments, block 302 can include adaptively deciding to increase the number of sensitivity measurements based on the nature of the response (e.g., via a user interface display that is updated based on the response results). For example, block 302 can include first analyzing sensitivity for a single process parameter across a range of values of the process parameter for the electronic component. If the results of this initial analysis determine that the response is substantially linear (or possibly another single-parameter function such as exponential) across the range of values, then block 302 can output just a single curve as response surface 204 for that process parameter. However, if the results of the initial analysis of a single parameter does not result in a linear response, then a pair-wise analysis of two different process parameters can be performed, as will be described in more detail below. For a pair of process parameters to be considered together, both or either should have sufficient independent non-linearity. For example, non-linearity can be determined by the ratio of positive and negative side sensitivities. Furthermore, the difference between a simple vector sum of single parameter sensitivity and the sensitivity from simulation of a combination of two parameters can be used to decide the extent of further combinations of simulations.

Figure 4:
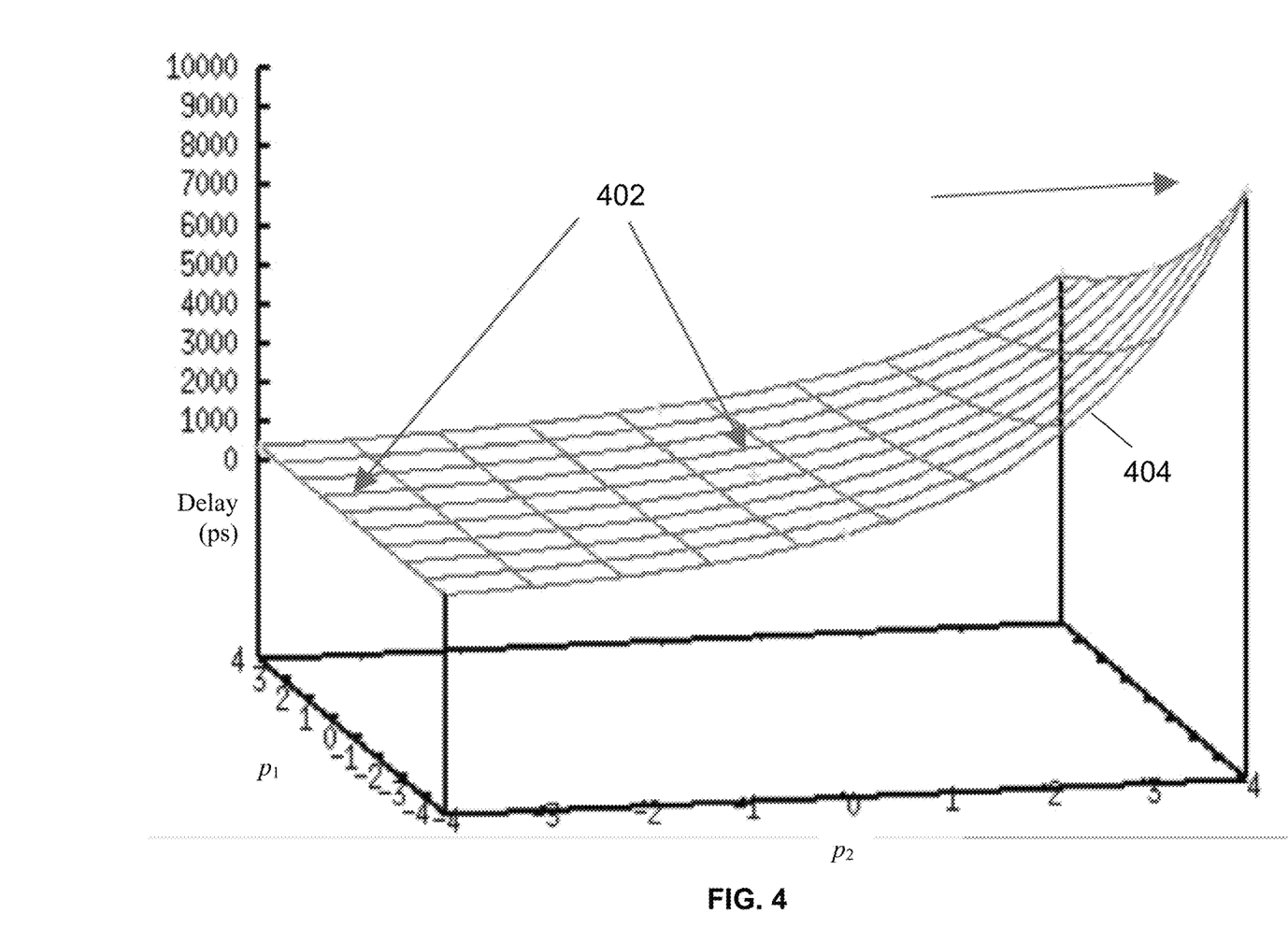
FIG. 4 is a diagram illustrating an example response surface for a process parameter according to embodiments.

FIG. 4 illustrates an example of how block 302 performs a pair-wise sensitivity analysis of two different process parameters $p_1$ and $p_2$. As shown in this example, both of the parameters have values that range from −4 to +4. This is an accordance with an example embodiment where a foundry provides SPICE model process parameter values (e.g., together with other information for the electronic component in library 106) as unit-less values and in terms of sigma from a nominal value (e.g., a value of −4 is −4 times sigma from the nominal value at 0).

As further shown in the example of FIG. 4, block 302 chooses to explore the sensitivity space by selecting measurement points 402. In this example, the measurement points are at ($p_1$, $p_2$) or (x,y as shown in FIG. 4)={(0,0) (nominal value)), (−4, 0), (+4, 0), (0, −4), (0, +4), (−4, −4), (−4, +4), (+4, −4), (+4, +4)}. Many other selections of measurement points are possible. At each of these measurement points, block 302 performs a SPICE analysis for the electronic component or timing arc using the process parameter values, and the given input slew and output load, for example. This SPICE analysis results in a delay value for the electronic component (the z-axis value shown in FIG. 4) at each of the measurement points 402. As set forth above, the present embodiments are not limited to characterizing a delay value, and can include characterizing other factors of interest such as a timing constraint.

Returning to FIG. 3, a next step in block 304 is build a model equation 208 of the surface response 204 obtained in block 302. The order of the equation 208 and the equation terms can be adaptive to the extent of the sensitivity analysis performed in block 302. For example, if the analysis performed in block 302 determined that the response for a single process parameter was substantially linear or exponential, the equation 208 can be a function of only the single process parameter. For example, the equation 208 can have the form of $f(p)=f(0)+a*p$, $f(p)=f(0)+a*p+b*p*p$ or $f(p)=f(0)+(a*e^{-b*p}-1)$, where $f(0)$ is the nominal value and a and b are scalar parameters that are determined in block 304 using any of a number of well-known curve fitting techniques.

Otherwise, when block 302 performs a pair-wise analysis of two different parameters as shown in FIG. 4, block 304 can include fitting a surface 404 to the measurements obtained in block 302 (e.g., via a user interface that displays the surface 404 and allows a designer to adjust the parameters in response). In this case, block 304 can produce an equation of the form of:

$$f(P) = f(0) + \sum_i f(p_i) + \sum_{i!=j} f(p_i, p_j)$$

where $f(0)$ is the nominal value at the measurement point $(0,0)$, $f(p_i)$ can be a linear or exponential equation of a single parameter as described above, and $f(p_i, p_j)$ can be a function of two different parameters, such as a bilinear or non-fitted equation. Many known surface-fitting techniques known to those skilled in the art can be used to obtain such an equation 208.

Returning to the example methodology shown in FIG. 3, a next block 306 can include performing a Monte-Carlo simulation on the surface model obtained in block 304. For example, random values of each process parameter included in the equation obtained in block 304 are generated (e.g., within the range of −4 to +4), and used as input values in the equation produced in block 304. The resulting output of the equation is then recorded at each of these random values, which can include on the order of 100 k samples, for example, and yields a set of variation results 212.

Figure 5:
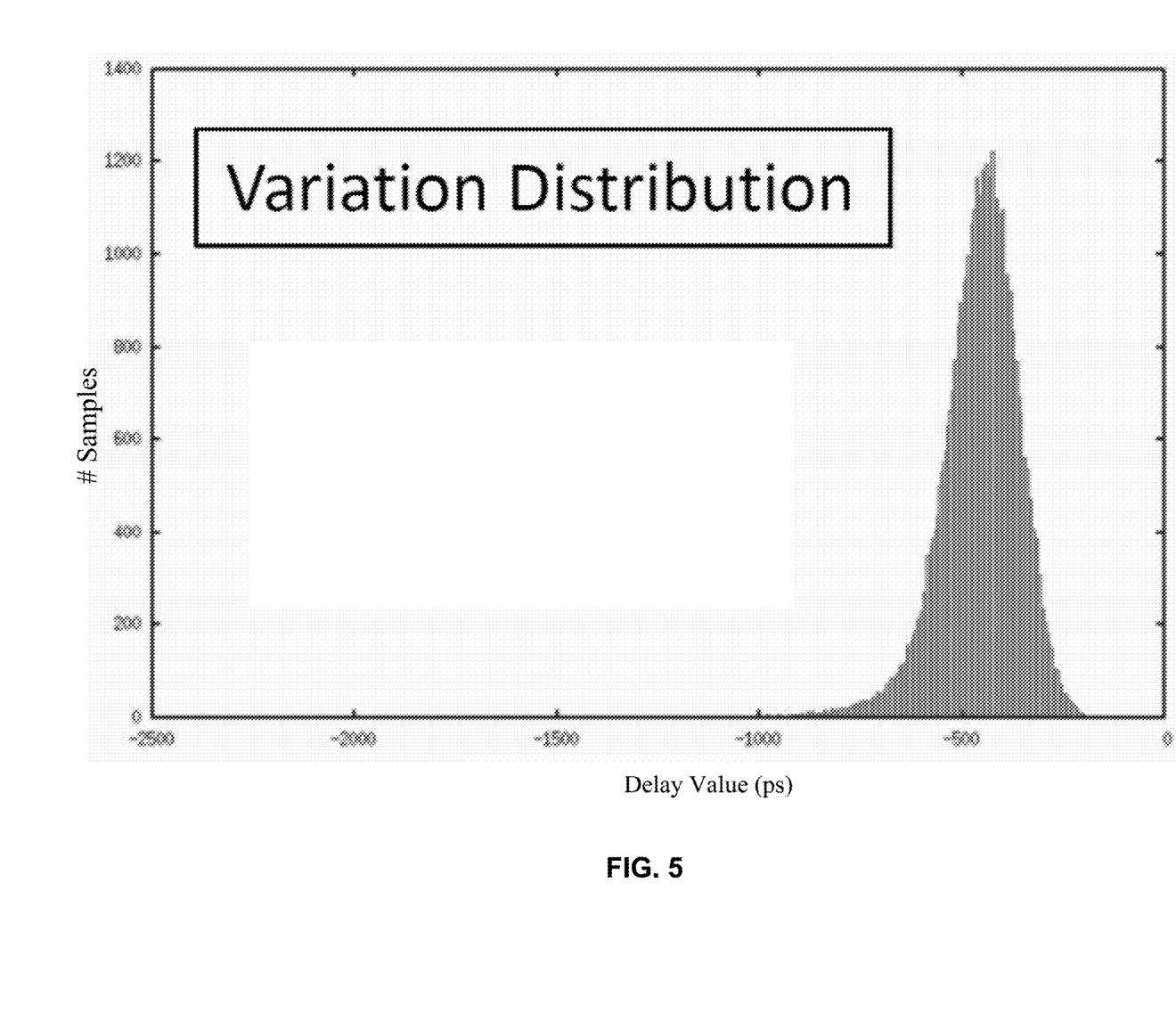
FIG. 5 is a diagram illustrating an example variation distribution for extracting timing parameters of an electronic component according to embodiments.

A final block 308 can include measuring or evaluating these variation results to extract OCV and other timing parameters for the process parameters of interest and the particular value of slew/load, for example. As shown in the example of FIG. 5, the simulation performed in block 306 can result in a distribution of variation results. In this example, the results are recorded as a collection of results in the form of a histogram representing a number of samples for each output delay value of the equation 208. From this histogram, all aspects of distribution can be extracted, such as mean, sigma, quantile, skewness, kertosis, moments, etc. Many well-known statistical and mathematical techniques can be used to extract these parameters.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of characterizing a timing model of an electronic component in the presence of on-chip variations corresponding to a plurality of processing parameters, the method comprising:

performing, by one or more processors, a sensitivity analysis for delay and output transition time on certain of the processing parameters;

building, by the one or more processors, a surface model based on the sensitivity analysis, the surface model representing a response of the electronic component to changes in the certain of the processing parameters, the surface model being built by identifying a response surface based on results of the sensitivity analysis and fitting a model equation to the response surface, the obtained surface model corresponding to the identified response surface and the fitted model equation;

performing, by the one or more processors, a Monte Carlo simulation on the surface model using a multitude of values of the certain of the processing parameters; and extracting, by the one or more processors, one or more of the timing model data as a function of on-chip variation parameters by measuring variation results of the performed simulations.

2. The method of claim 1, wherein performing the sensitivity analysis includes:

performing a first sensitivity analysis on one of the processing parameters;

determining whether the response of the electronic component to changes in the one processing parameters is substantially linear; and if the response is not substantially linear, performing a second pair-wise sensitivity analysis on the one processing parameter and another one of the processing parameters.

3. The method of claim 1, wherein performing the sensitivity analysis includes selecting a plurality of sensitivity points in a range around a nominal value of the certain of the processing parameters for use in the sensitivity analysis.

4. The method of claim 1, wherein performing the sensitivity analysis includes performing a SPICE simulation of the electronic component using the certain of the processing parameters.

5. The method of claim 1, wherein fitting the model equation includes adaptively selecting model equation terms to use in the model equation.

6. The method of claim 1, wherein performing the Monte Carlo simulation on the surface model includes performing simulations using a multitude of random values of the certain of the processing parameters.

7. The method of claim 1, wherein extracting the one or more on-chip variation parameters includes:

building a collection of samples using the results of the Monte Carlo simulation; and computing one or more of a moment and a quantile of the one or more on-chip variation parameters using the collection.

8. A computer program product comprising a non-transitory storage medium storing instructions, which when executed by one or more processors, causes the one or more processors to perform a method of characterizing a timing model of an electronic component in the presence of on-chip variations corresponding to a plurality of processing parameters, the method comprising:

performing, by one or more processors, a sensitivity analysis for delay and output transition time on certain of the processing parameters;

building, by the one or more processors, a surface model based on the sensitivity analysis, the surface model representing a response of the electronic component to changes in the certain of the processing parameters, the surface model being built by identifying a response surface based on results of the sensitivity analysis and fitting a model equation to the response surface, the obtained surface model corresponding to the identified response surface and the fitted model equation;

performing, by the one or more processors, a Monte Carlo simulation on the surface model using a multitude of values of the certain of the processing parameters; and extracting, by the one or more processors, one or more of the timing model data as a function of on-chip variation parameters by measuring variation results of the performed simulations.

9. The computer program product of claim 8, wherein performing the sensitivity analysis includes:
   performing a first sensitivity analysis on one of the processing parameters;
   determining whether the response of the electronic component to changes in the one processing parameters is substantially linear; and
   if the response is not substantially linear, performing a second pair-wise sensitivity analysis on the one processing parameter and another one of the processing parameters.

10. The computer program product of claim 8, wherein performing the sensitivity analysis includes selecting a plurality of sensitivity points in a range around a nominal value of the certain of the processing parameters for use in the sensitivity analysis.

11. The computer program product of claim 8, wherein performing the sensitivity analysis includes performing a SPICE simulation of the electronic component using the certain of the processing parameters.

12. The computer program product of claim 8, wherein fitting the model equation includes adaptively selecting model equation terms to use in the model equation.

13. The computer program product of claim 8, wherein performing the Monte Carlo simulation on the surface model includes performing simulations using a multitude of random values of the certain of the processing parameters.

14. The computer program product of claim 8, wherein extracting the one or more on-chip variation parameters includes:
   building a collection of samples using the results of the Monte Carlo simulation; and
   computing one or more of a moment and a quantile of the one or more on-chip variation parameters using the collection.

15. A system for characterizing a timing model of an electronic component in the presence of on-chip variations corresponding to a plurality of processing parameters, the system comprising:
   an adaptive sensitivity analyzer configured to perform sensitivity analysis for delay and output transition time on certain of the processing parameters;
   an adaptive surface modeler configured to build a surface model based on the sensitivity analysis, the surface model representing a response of the electronic component to changes in the certain of the processing parameters, the surface model being built by identifying a response surface based on results of the sensitivity analysis and fitting a model equation to the response surface, the obtained surface model corresponding to the identified response surface and the fitted model equation;
   a model evaluator configured to perform a simulation on the surface model using a multitude of values of the certain of the processing parameters; and
   a parameter extractor configured to extract one or more of the timing model data as a function of on-chip variation parameters by measuring variation results of the performed simulations.

16. The system of claim 15, wherein the adaptive sensitivity analyzer comprises a SPICE simulator.

17. The system of claim 15, wherein the model evaluator comprises a Monte Carlo simulator.

18. The system of claim 15, wherein the on-chip variation parameters comprise LVF parameters.

\* \* \* \* \*